Aug. 22, 1961 C. C. JOHNSON 2,996,943

CARPENTRY SCREW

Filed Dec. 24, 1956 2 Sheets-Sheet 1

INVENTOR:

Clyde C. Johnson

CARPENTRY SCREW

Filed Dec. 24, 1956 2 Sheets-Sheet 2

INVENTOR:

Clyde C. Johnson 2,996,943
CARPENTRY SCREW

Clyde C. Johnson, 10213 7th Ave., Inglewood 47, Calif.

Filed Dec. 24, 1956, Ser. No. 630,259
1 Claim. (Cl. 85—41)

My present invention relates to screws, and more particularly to a novel screw for use in carpentry and the like, which screw is uniquely adapted to be impact driven for a considerable portion of its length into building material, and driven for the remainder of its length by torsion in the usual manner, and a method for making the same.

It is common practice, in fine carpentry such as furniture and cabinet making for example, to start fully threaded screws in properly located pilot holes made either by an awl, punch, or drill. This practice, however, requires extra operations and is time consuming, and an alternative practice is therefore commonly resorted to wherein the starting holes are omitted; the point of a fully threaded screw simply being placed at the desired spot and driven like a nail for a considerable portion of its length directly into the building material with a hammer, and subsequently driven home in the usual manner with a screwdriver. This latter practice, while admittedly faster, has one serious disadvantage in that the screw-head slot is inevitably marred or battered out of shape making it difficult and frequently impossible to position a screwdriver therein. Moreover, direct impacts delivered upon the screw head work-hardens the screw material which results in the screw head being brittle and thereby reducing the strength thereof.

A still further disadvantage results from driving a screw into material by direct impact in that the major diameter or crest of the screw thread cuts a much larger hole in the material than is necessary, thereby greatly reducing the holding power of the screw thread adjacent the screw head. Properly, once such a screw is removed from the hole, a large diameter screw must be reinstalled or a new location and hole resorted to.

The ideal means for starting screws is thus to provide a pilot hole in building material in which a screw is to be inserted, the pilot hole being of appropriate diameter and depth to securely position the screw while the screw is finally turned and securely clinched in place. Actually, the pilot hole provided should have a diameter no greater than the minor diameter of the screw which is to be inserted therein. It can clearly be seen that when a fully threaded screw is driven an appreciable distance into wood, the hole diameter must correspond in diameter to the major diameter of the screw-thread. It naturally follows then, that when the screw is driven home, the threads adjacent the head of the screw have little or no holding power. The entire holding power of the screw is actually restricted to the few reduced diameter threads near the penetrating end of the screw, which is for most purposes highly unsatisfactory.

It is an object of my present invention to provide a screw capable of making a starting or pilot hole having a diameter conforming in size to the minor diameter of the screw thread thereof.

It is a further object of my invention to provide a screw having optimum holding power after being driven for a considerable portion of its length into building material, and a method of making the same.

It is a still further object of my invention to provide a screw having maximum holding power adjacent the head thereof.

It is a still further object of my invention to provide a screw according to the preceding objects which can be driven like a nail for a substantial portion of its length into the material in which the same is to be used without deforming the screwdriver slot.

Briefly, in one preferred embodiment thereof, the screw of my invention comprises a screw shank having a slotted head on one end thereof, the head being provided with means surrounding at least a portion of the screwdriver slot to absorb impacts delivered thereon for driving the screw into building material. Extending from the head, a continuous helical thread is provided on the shank. On the other end of the shank, means is provided to make a starting or pilot hole having a diameter smaller than the minor diameter of the threaded portion of the screw shank.

The screw of my invention will be more easily understood, and other objects and advantages inherent therein will be seen in the ensuing detail description and drawings wherein.

Figures 1, 2, 3, 4, 5, 6, 7:
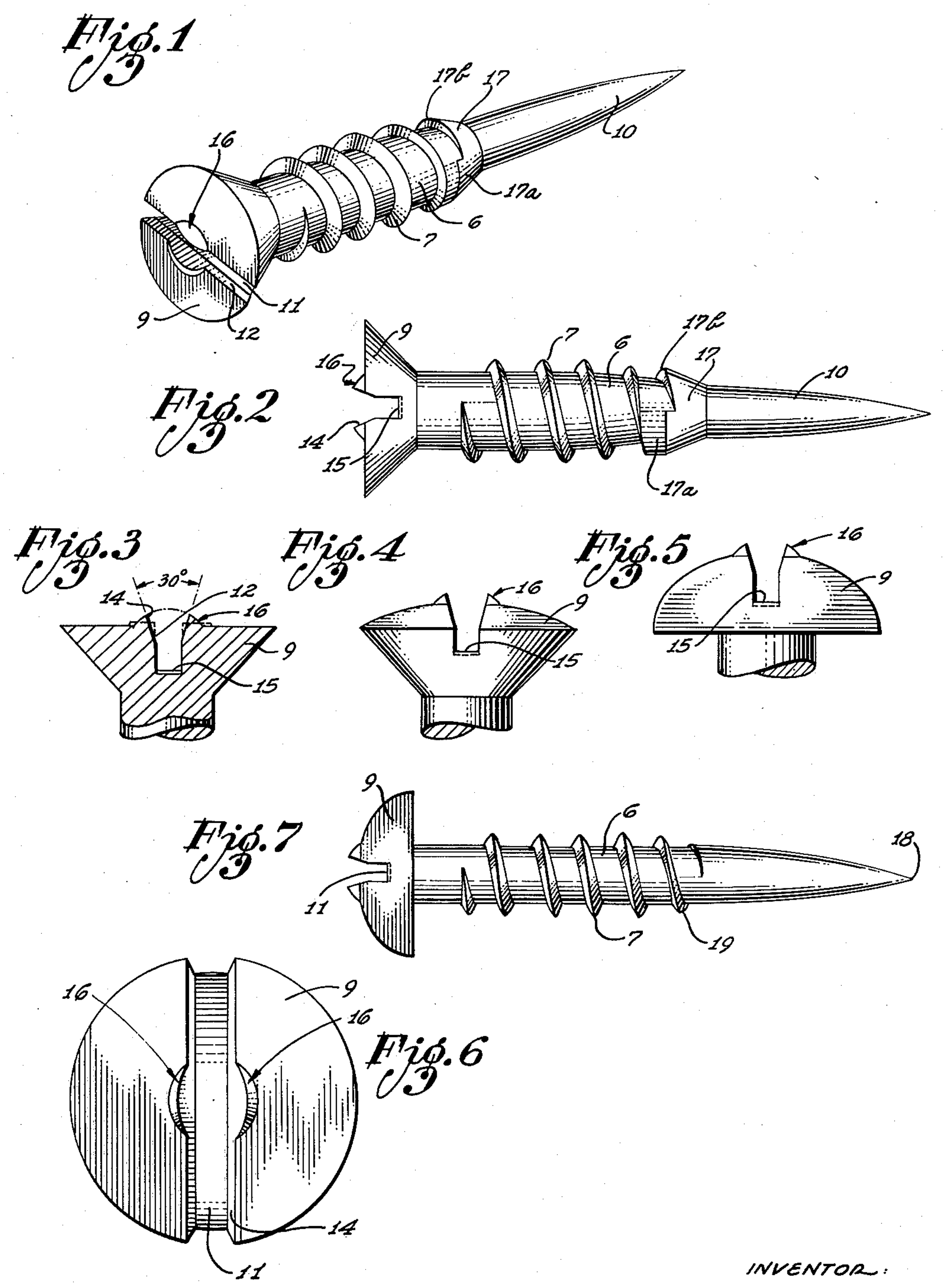
FIGURE 1 is a perspective view of a preferred embodiment of the screw of my present invention.
FIGURE 2 is a side elevation view of the screw shown in FIGURE 1.
FIGURE 3 is a fragmentary cross-sectional view showing the head and tool slot of the screw shown in FIGURES 1 and 2, with dotted lines indicating the shape of the material of the impact receiving means flattened after impact.
FIGURE 4 is a fragmentary elevational view of the oval head embodiment of the screw shown in FIGURES 1 and 2.
FIGURE 5 is a fragmentary elevational view of the round head embodiment of the screw shown in FIGURES 1 and 2.
FIGURE 6 is an enlarged top view of a flat head type screw showing the impact receiving feature of my present invention.
FIGURE 7 is a side elevational view showing a modified embodiment of the screw of FIGURES 1 and 2.

In FIGURES 1 and 2, I show a preferred embodiment of the screw of my present invention wherein the screw shank 6 is provided with a continuous helical thread 7 tapering slightly so that the root diameter is smaller than the largest dimension of tapered portion, a head 9 on one end thereof, and pilot 10 on the other end thereof. The head 9 is provided with a screw driver slot 11 characterized by a tapered portion 12 on each side of its opening adjacent the top plane of the head; this tapered portion 12 which is more clearly shown in FIGURE 3, being widest at the opening 14 and narrowest approximately midway between the opening and the bottom 15 of the slot. Along each edge of the opening of the screw driver slot 11, I provide a raised portion 16 which tapers away from the slot 11 at angles of approximately 15° on each side to form an included angle of 30° therebetween as shown. The raised portion 16 is defined by a generally hemispherical node or bulb concentrically formed on the screw head 9 at the same time the head is formed on the screw shank 6 during manufacture thereof, by a method which will be described later.

It will be apparent, however, that the bulb 16 and head 9 can be formed simultaneously, and preferably prior to cutting the screw driver slot 11 as will be described later.

FIGURES 3, 4 and 5 show different shapes of screw heads provided with the bulb 16 of my invention.

By means of the bulb 16 along each edge of the screw driver slot 11, extra material is provided so that when the screw is driven into building material by means of a hammer for example, the bulb 16 will absorb the shock of the impacts and the material of the bulb 16 will tend to move or flow in the direction of the tapered opening 14 of the screw driver slot 11. I have found that the displaced bulb material will blend into the tapered opening 14, only negligibly altering the angle of taper therein but without closing the slot opening 11, i.e., the width of the screw driver slot 11 is not diminished to an extent wherein any difficulty will be encountered in inserting a screw driver therein for turning the screw into place. Moreover, I have found that the appearance of the screw head 9, after inserton in cabinets, furniture, and other work pieces wherein appearance is important, is actually enhanced by the bulb 16.

The unthreaded portion of the screw shank 6 or pilot 10 at the penetrating end of the screw can extend from a shoulder 17 formed at the end of the screw thread 7 as shown in FIGURES 1 and 2, and has been found most satisfactory for use in soft wood. The larger diameter **17*a* above shoulder 17 will provide an enlarged hole in the material (not shown) in which the first or leading thread 17*b* of the screw will be securely positioned to effectively guide the helical screw thread into the material. The pilot 10 will provide an adequate starting or locating hole upon the impact driving of the screw above the larger diameter 17*a*** portion thereof.

The pilot 10 will provide an adequate starting or locating hole upon the initial impact driving, and the screw can be driven for the remainder of its length with a screwdriver; the threads 7 having maximum holding power adjacent the head 9.

The particular embodiment of the screw of my invention shown in FIGURE 7, where the shoulder 17 shown in FIGURES 1 and 2 is omitted, is highly satisfactory for use in hard woods such as oak and walnut, for example. Here, the diameter of the screw shank 6 is uniform from the head 9, tapering only near the penetrating end 18. It will be obvious that the screw can be impact driven until the outer end of the thread 7 abutts the surface of the material, and easily driven for the remainder of the shank length, and in the hard woods the holding power of the thread will not be reduced appreciably as a result of the starting hole.

One preferred method of manufacture of the screw of my invention will be described with reference being made to FIGURES 8–12.

Figures 8, 9, 10:
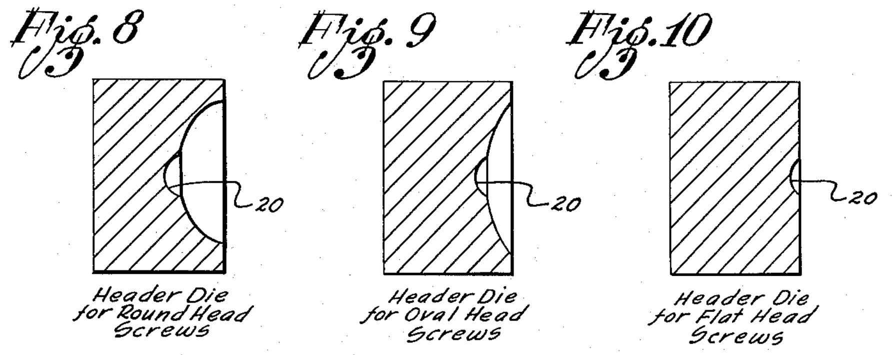
FIGURE 8 is a cross-sectional view of a screw heading die for round head type screws.
FIGURE 9 is a cross-sectional view of a screw heading die for oval head type screws.
FIGURE 10 is a cross-sectional view of a screw heading die for flat head type screws.

To form the impact absorbing means on each of the main types of screw heads, FIGURES 8, 9 and 10 illustrate one preferred die cavity 20 configuration for use in a conventional screw machine. It is not deemed necessary to exhaustively describe a screw machine herein, inasmuch as such machines are so well known in the art. It can easily be seen in FIGURES 8, 9 and 10 that the nodule or bulb can be formed simultaneously with the forming of the screw head, the mold cavity for the bulb being consolidated with the head forming cavity 20 in the same die.

As is well known, the forming of the head, in some screw machines is accomplished by driving the screw blank into the die with sufficient force to shape the material at the proper end of the blank into the head.

Figures 11, 12, 13, 14, 15, 16, 17, 18, 19, 20, 21, 22:
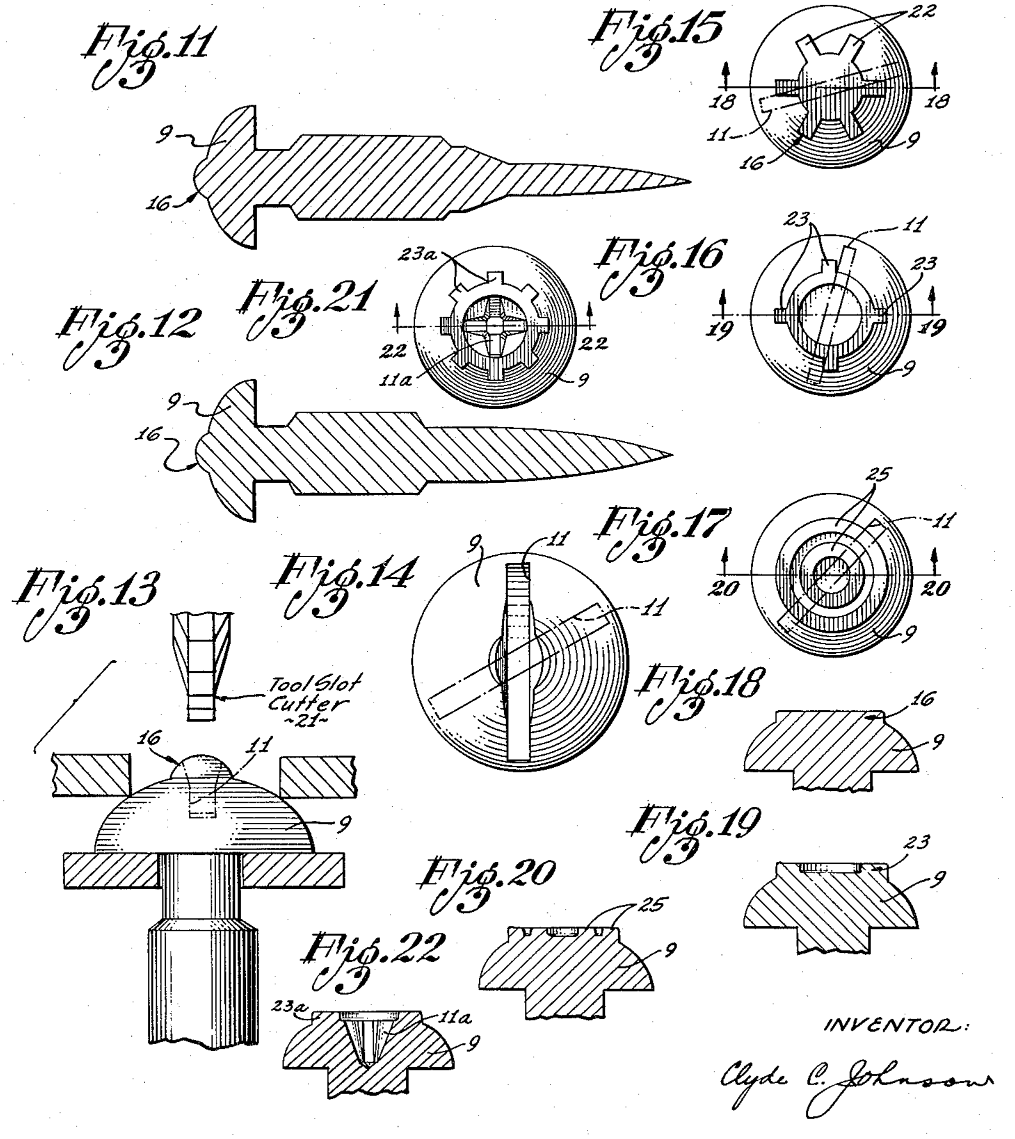
FIGURE 11 is a cross-sectional view of the screw blank of the screw of FIGURES 1 and 2 showing the profile thereof before the tool slot or threads are formed thereon.
FIGURE 12 is a cross-sectional view of the screw blank of the screw shown in FIGURE 7 showing the profile thereof before the tool slot or thread is formed thereon.
FIGURE 13 is a diagrammatic fragmentary view showing the tool slot cutter in position to cut the tool slot in a round head type screw of my invention, the slot portion being indicated by dotted line.
FIGURE 14 is a diagrammatic view showing the top of a screw head and illustrating the manner in which the tool slot is located and dimensioned.
FIGURE 15 is a diagrammatic view showing the top of another embodiment of the screw head of my invention wherein a plurality of tool slots are arranged in the form of a spider type arrangement.
FIGURE 16 is a diagrammatic view showing the top of still another embodiment of the screw head of my present invention showing the tool slot arranged in two directions.
FIGURE 17 is a diagrammatic view of a further embodiment of a screw head which can be adapted to the screw of my present invention wherein the impact absorbing means takes the form of two concentric rings surrounding the tool slot.
FIGURE 18 is a cross-ssectional side elevational view of the screw head shown in FIGURE 15.
FIGURE 19 is a cross-sectional side elevational view of the screw head shown in FIGURE 16.
FIGURE 20 is a cross-sectional side elevational view of the screw head shown in FIGURE 17.
FIGURE 21 is a diagrammatic view showing the top of yet another embodiment of my invention wherein the concentric ring surrounds an indention formed in the head for turning screw into place.
FIGURE 22 is a cross-sectional side elevational view of the screw head shown in FIGURE 21.

FIGURES 11 and 12 show partially finished blanks of two configurations in the further forming of the screw shanks both of which are within the purview of by present invention.

FIGURE 13 illustrates the cutting of the tool slot 11 in the blanked heads 9 of the screws shown in FIGURES 11 and 12, the slot cutter 21 being appropriately shaped to provide the correctly angled portions of the screw slot 11 embodied in my invention.

FIGURES 15 through 17 depict modified versions of the screw head of my invention in plan views to demonstrate the versatility inherent in my present invention wherein the tool slot 11 can be cut in random directions in any of the particular embodiments described herein. For example, in FIGURES 15 to 17, the impact absorbing means is more or less artistically formed in the shape of a spider having six leg portions 22 any aligned combinations of which will accommodate a screw driver. In FIGURE 16, the spider-shaped raised areas have four leg portions 23. In each case the tool slot can be more or less cut in any position the screw happens to be in during fabrication thereof.

In FIGURES 17 and 20, raised annular rings 25 concentrically positioned in the screw head form the impact absorbing means of my invention.

It is thus amply demonstrated, in FIGURES 15 through 20, that the novel and useful impact absorbing means of my invention also enhances the appearance of the screws where such screws must be visible in wood work.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claim.

I claim:

A screw comprising: a screw shank having a continuous helical screw thread thereon, a head on one end of said screw shank, the top surface of said head being flat and perpendicular to the axis of the screw, a raised head portion of substantially smaller diameter than said head and extending concentrically from said top surface of said head to define a hemispherical node thereon, a transverse tool slot in said head and bisecting said node into equal portions on each side of the upper opening of said slot, the facing surfaces of said equal portion merging into the upper portions of the walls of said tool slot, said surfaces and the upper portion of tool slot walls diverging outwardly at angles of 15° on each side of the center line of said slot, the remainder of walls of said tool slot extending perpendicularly to the bottom of said slot in said head, a tapered shoulder having a large diameter substantially equal to the crest diameter the leading screw thread on the other end of said screw shank, the large diameter portion of said shoulder being adjacent said screw shank, and a pointed unthreaded pilot member extending coaxially from the small diameter portion of said tapered shoulder.

References Cited in the file of this patent

UNITED STATES PATENTS

| | | |
|---|---|---|
| 10,171 | Pratt | Oct. 25, 1853 |
| 391,097 | Thayer | Oct. 16, 1888 |
| 410,698 | Rogers | Sept. 10, 1889 |
| 1,274,923 | Meyner | Aug. 6, 1918 |
| 2,015,159 | Rosenberg | Sept. 24, 1935 |
| 2,053,918 | Peretzman | Sept. 8, 1936 |
| 2,213,813 | Hunt | Sept. 3, 1940 |
| 2,238,960 | Wilcox | Apr. 22, 1941 |
| 2,304,704 | O'Leary | Dec. 8, 1942 |

FOREIGN PATENTS

| | | |
|---|---|---|
| 8,323 | Great Britain | June 7, 1888 |
| 158,599 | Germany | Feb. 22, 1905 |